June 17, 1941.  F. CAZENAVE  2,245,757
COCK AND THE LIKE
Filed Oct. 9, 1939
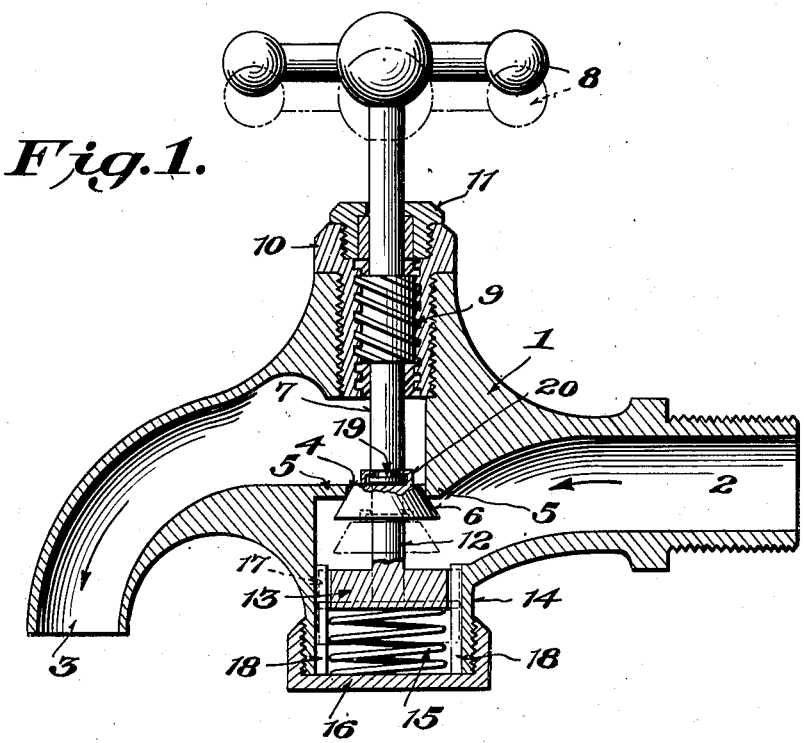
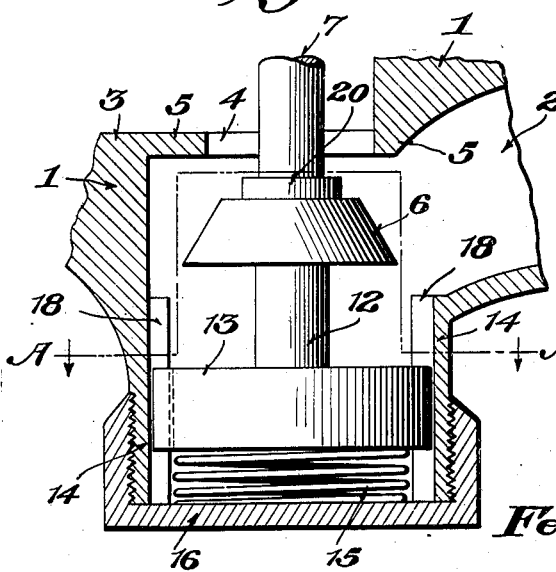
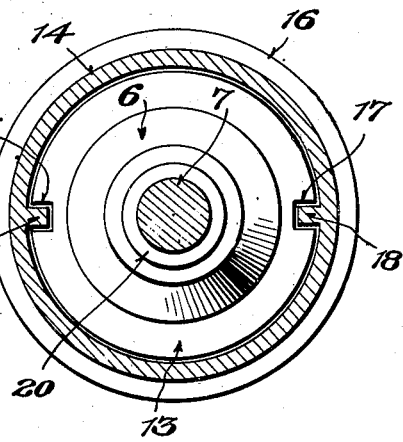
Inventor
*Fernando Cazenave,*
By Willhauser & Groff
Attorneys Patented June 17, 1941

2,245,757

UNITED STATES PATENT OFFICE 2,245,757

COCK AND THE LIKE

Fernando Cazenave, Buenos Aires, Argentina

Application October 9, 1939, Serial No. 298,650
In Argentina August 18, 1939

1 Claim. (Cl. 251—27)

This invention relates to improvements in faucets or bibcocks and the like and a substantial object of the invention consists in providing certain improved features in the devices of this kind whereby evident advantages in their operation and use will be secured.

One of the improvements in accordance with this invention consists in constructing the valve element which performs the opening and closure of the faucet in the shape of a truncated cone and forming the corresponding valve seat with a sharp ridge, whereby a perfectly tight closure of the faucet will be obtained.

A further improvement of this invention consists in providing said valve element with a guide means so as to secure a perfectly rectilineal motion of the same and prevent any possible rotation of said element. This arrangement offers the advantage that even in the case the valve or its seat being substantially worn, the contact surfaces of both parts will notwithstanding snugly fit one to the other, so as to maintain a tight adjustment throughout the while life of the device.

A further advantage still of this improved type of faucet consists in providing the corresponding valve element with a back pressure area, adapted to prevent the instantaneous closure of the faucet and thus avoid any knocking effects liable to damage the device.

The invention also aims at other objects which will more particularly be referreed to in the course of this specification.

In order that the invention may be clearly understood and readily carried into practice, a preferred form of construction of the same has been shown by way of example in the accompanying illustrative drawing, in which:

Figure 1 is a longitudinal vertical section of the novel type of faucet, provided with the improvements according to this invention.

Figure 2 is a partial view of a detail of the valve device which incorporates the particular features of this invention, drawn to a larger scale, and Figure 3 is a horizontal section on the line A—A of Figure 2.

In said drawing, the same numbers of reference are used to indicate like or corresponding parts in the several views.

In the embodiment shown, the reference number 1 indicates the casing or body part of a faucet or bibcock of the usual type, supplied with water from the mains by means of a duct 2 which communicates with the outlet duct 3 by means of an opening 4, peripherally confined by a circular seat 5 which acts as a support for the valve element 6. Said valve 6 is opened by the downward movement imparted thereto by the stem 7 integral with the operating handle 8; said valve stem is formed with screw threads 9 which engage with the internal threads of a detachable head piece 10, adapted to be secured by any suitable means to the casing 1 and into the upper end of which is threaded the collar nut 11 for retaining a packing device which prevents the liquid from leaking out along said valve stem 7.

In accordance with this invention, the valve element 6 is, as stated before, of the shape of a truncated cone and the lower edge of the corresponding seat 5 is formed with a sharp ridge, adapted to provide for a snug fitting between both parts of the element.

With reference to Figures 1 and 2, it will be seen that from the lower face of the valve 6, a stem 12 extends, formed at its lower end with a flat disc 13, adapted to slide in the interior of a tubular extension 14 formed at the lower part of the casing 1 of the faucet, and the lower face of said disc is being forced in an upward direction by a spring 15, of coiled or other suitable type, seated within a cap 16, screwed or otherwise secured to the lower end of said extension 14. In the edge of the disc 13, one or several notches 17 are formed, in which engage one or several vertical guides 18, formed on the inner wall of the tubular extension 14, whereby a perfectly rectilinear motion of said disc 13 and its integral stem 12 will be assured and any rotation of the same will be prevented. To provide for the connection between the operating stem 7 and the stop valve 6, the lower end of said stem is formed with an annular groove 19 within which engages, after the manner of a bearing, an annular collar 20, formed integral with the valve element 6, whereby a rotatable connection between the two parts is established.

As has already been stated above, the faucet constructed in the manner described, offers the advantage of a perfectly tight closure, as, owing to the valve element 6 being fixed in angular direction, even in the case the contact surfaces should be heavily worn away, both parts will be kept in close juxtaposition by the very moulding or shaping action performed by one member on the other.

Besides, the valve is assisted in its closing action by the pressure of the liquid which enters by the duct 2, which by simultaneously exerting a certain amount of pressure on the upper side of the disc 13, will tend to retard the closure of the valve 6 and thus prevent the same from knocking, a default which frequently affects the usual types of faucets or bibcocks.

From the foregoing description, the manner of operating of the faucet in accordance with this invention will be readily understood by those skilled in the art without necessity of further explanations.

It will be evident that several modifications of construction and detail may be introduced without departing from the scope of this invention which will particularly be set forth in the following claim.

Having now clearly described the nature of the said invention and the manner in which the same is to be performed, I declare that what I claim as new and desire to secure by Letters Patent, is:

A faucet, comprising, a casing having inlet and outlet connections, a valve seat therebetween, said valve seat having a sharp peripheral edge, a tubular extension formed on the casing at one side of the valve seat and coaxially therewith, a cap detachably fitted to the extension; a one-pieve valve device including a truncated conical head for engaging the sharp peripheral edge of the valve seat, a stem of smaller diameter than said head, a disc connected with said stem, said disc having a close non-tiltable sliding fit in the said extension; cooperating means on the disc and inner wall of the extension to prevent relative rotary movement between the valve device and the valve seat, a coil spring of substantially the same diameter as the disc and confined between the underside of the disc and the inner face of the cap to urge the said head toward the sharp peripheral edge of the valve seat under uniform pressure, a hand-operated screw-threaded stem movable in the casing and having an annular groove at its lower end, and a collar on the truncated face of the valve head and having a portion thereof seated in said groove of the stem, whereby rotation of the stem in one direction will assist the spring in forcing the head to a closed position on the seat and rotation of the stem in the other direction will unseat the valve head from the seat against the pressure of the spring.

FERNANDO CAZENAVE.